J. H. GOULD.
Hoes.
No. 142,159.          Patented August 26, 1873.
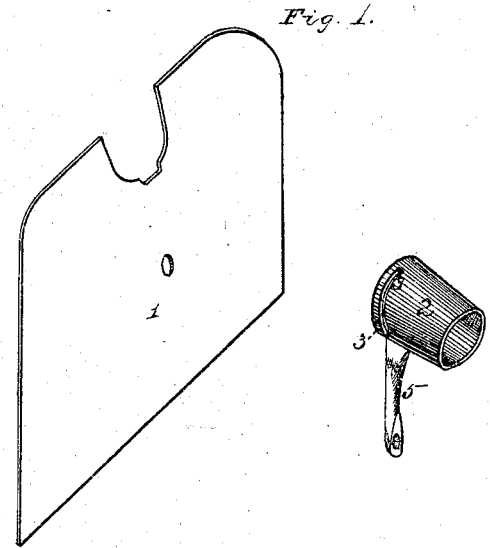
WITNESSES.
INVENTOR.

UNITED STATES PATENT OFFICE.

JACOB H. GOULD, OF RUTLAND, OHIO, ASSIGNOR OF TWO-THIRDS HIS RIGHT TO HORACE HOLT, OF SAME PLACE.

IMPROVEMENT IN HOES.

Specification forming part of Letters Patent No. 142,159, dated August 26, 1873; application filed July 25, 1873.

*To all whom it may concern:*

Be it known that I, JACOB H. GOULD, of Rutland, in the county of Meigs and State of Ohio, have invented certain new and useful Improvements in Hoes; and I do hereby declare the following to be a full, clear, and exact description of the invention, such as will enable others skilled in the art to which it pertains to make and use it, reference being had to the accompanying drawings, which form part of this specification.

The nature of my invention relates to an improvement in hoes; and it consists in the manner of securing the eye or socket to the blade so as to make the hoe lighter, cheaper, and more substantial than is usually done, as will be more fully set forth hereafter.

The accompanying drawings represent my invention.

1 represents the blade of the hoe, having a piece, of any suitable size or shape, cut out of its top, so as to receive the eye or socket 2 for holding the handle. This eye is of the usual tubular shape, and has a groove, 3, cut in opposite sides near the rear end, of suitable size and width to receive the edges of the plate, and has extending downward from it a brace, 5. The eye is placed in the opening in the top of the plate 1, so that the grooves will fit over the edges, and is then driven down into it until it fills the opening, and is firmly secured therein, when a rivet is passed through the brace and blade, so as to fasten them together as one solid piece.

By this simple means of securing the parts together the hoe is made lighter, cheaper, and more substantial than is usually done.

The edges of blade may be made to extend through the slots into the eye so as to bite into the sides of the handle, and thus assist in securing it in position.

Having thus described my invention, I claim—

The recessed blade 1, in combination with the eye 2 having the brace 5, and transverse slots 3 to receive the edges of the recess in the blade, substantially as shown and described.

In testimony that I claim the foregoing I have hereunto set my hand and seal this 7th day of July, 1873.

J. H. GOULD. [L. S.]

Witnesses:
   B. M. TUCKERMAN,
   C. B. HOLT.